(12) United States Patent
Kondo

(10) Patent No.: US 6,873,738 B2
(45) Date of Patent: *Mar. 29, 2005

(54) HIERARCHICAL IMAGE PROCESSOR FOR ENCODING OR DECODING, AND MEMORY ON THE SAME CHIP

(75) Inventor: Tetsujiro Kondo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 191 days.

(21) Appl. No.: 08/722,395

(22) Filed: Sep. 30, 1996

(65) Prior Publication Data

US 2001/0012404 A1 Aug. 9, 2001

(30) Foreign Application Priority Data

Oct. 2, 1995 (JP) .............................................. 7-278349
Oct. 5, 1995 (JP) .............................................. 7-284655

(51) Int. Cl.⁷ ................................................. H04N 4/17
(52) U.S. Cl. ................................................... 382/240
(58) Field of Search .......................... 382/240; 348/416, 348/417, 699, 421, 420, 422, 700, 408, 416.1, 407.1, 420.1, 421.1, 422.1, 408.1; 358/433, 405, 464; 375/240

(56) References Cited

U.S. PATENT DOCUMENTS

| | | | | |
|---|---|---|---|---|
| 4,858,017 A | * | 8/1989 | Torbey ........................ 358/426 |
| 4,910,594 A | * | 3/1990 | Kondo .................. 375/240.12 |
| 4,947,447 A | * | 8/1990 | Miyaoka et al. .............. 382/56 |
| 5,142,360 A | * | 8/1992 | Niihara ........................ 358/105 |
| 5,282,255 A | * | 1/1994 | Bovik et al. ................. 382/239 |
| 5,351,095 A | * | 9/1994 | Kerdranvat ................. 348/699 |
| 5,473,751 A | * | 12/1995 | Ohuchi ........................ 345/563 |
| 5,477,272 A | * | 12/1995 | Zhang et al. ................ 348/407 |
| 5,485,588 A | * | 1/1996 | Singh ............................. 711/5 |
| 5,510,848 A | * | 4/1996 | Nocture et al. ............. 348/556 |
| 5,576,845 A | * | 11/1996 | Komatsu ..................... 358/433 |
| 5,579,412 A | * | 11/1996 | Ando ........................... 382/240 |
| 5,581,302 A | * | 12/1996 | Ran et al. .................... 348/416 |
| 5,610,658 A | * | 3/1997 | Uchida et al. .............. 348/416 |
| 5,635,994 A | * | 6/1997 | Drexler et al. .............. 348/699 |
| 5,692,012 A | * | 11/1997 | Virtamo et al. ............. 375/240 |
| 5,760,922 A | * | 6/1998 | Kojima ........................ 358/464 |
| 5,859,667 A | | 1/1999 | Kondo et al. | |
| 5,930,394 A | | 7/1999 | Kondo et al. | |
| 5,959,676 A | | 9/1999 | Kondo | |
| 6,115,507 A | * | 9/2000 | Eglit et al. ................... 382/300 |

FOREIGN PATENT DOCUMENTS

EP          0 627 859        12/1994

OTHER PUBLICATIONS

W.–C. Fang, C.–Y. Chang, B. J. Sheu, T.–C. Chen, and John C. Curlander; "VLSI Sytolic Binary Tree–Searched Vector Quantizer for Image Compression" IEEE Catalog # 9214280, p. 33–44, Mar. 1994.*

(Continued)

Primary Examiner—Timothy M. Johnson
(74) Attorney, Agent, or Firm—Frommer Lawrence & Haug LLP; William S. Frommer; Dennis M. Smid

(57) ABSTRACT

A memory apparatus for use with a digital picture signal. The apparatus may comprise a first signal processor for receiving an input digital picture signal and for performing a hierarchical encoding process thereon so as to form hierarchical encoded picture data, a memory for storing the hierarchical encoded picture data from the first signal processor, and a second processor for receiving the hierarchical encoded picture data from the memory and for decoding the received hierarchical encoded picture data in accordance with a hierarchical decoding process to restore the input digital picture signal. The first signal processor, the memory and the second processor being disposed on a common semiconductor substrate.

25 Claims, 10 Drawing Sheets

OTHER PUBLICATIONS

M. Vishwanath, R. M. Owens, and M. J. Irwin; "VLSI Architectures for the Discrete Wavelet Transform" IEEE Catalog # 9410949, p. 305–316, May 1995.*

Bor–Min Wang, Jui–Cheng Yen and Shyang Chang; "Zero Waiting–Cycle Hierarchical Block Matching Algorithm and its Array Architectures" IEEE Catalog # 9215862, pp. 18–28, Feb. 1994.*

L. Wang, *Reduced–difference pyramid: a data structure for progressive image transmission*, Optical Engineering, Jul. 1989, vol. 28, No. 7, pp 708–716.

Winzker M et al: "VLSI Chip Set for 2D HDTV Subband Filtering with On–Chip Line Memories" IEEE Jounal of Solid–State Circuits, vol. 28, No. 12, Dec. 1, 1993, pp. 1354–1361, XP000435910.

Goldberg M et al: "Comparative Performance of Pyramid Data Structures for Progressive Image Transmission" IEEE Transactions on Communications, vol. 39, No. 4, Apr. 1, 1991, pp. 540–547, XP000241265.

Queroz R L De et al: "On a Hybrid Predictive –Interpolative Scheme for Reducing Processing Speed in DPCM TV CODECS" Sep. 18, 1990, Signal Processing Theories and Applications, Barcelona, Sep. 18–21, 1990, vol. vol. 2, Nr. Conf. 5, p.(S) 797–800, Torres L;Masgrau E; Lagunas M A XP000365713.

Javier Vega–Pineda et al: "VLSI Implementation of a Wavelet Image Compression Technique Using Replicated Coding/Decoding Cells" Apr. 30, 1995, 1995 IEEE International Symposium on Circuits and Systems (ISCAS), Seattle, Apr. 30–May 3, 1995, vol. vol. 2, p.(S) 1173–1176, Institute of Electrical and Electronics Engineers XP000558881.

* cited by examiner

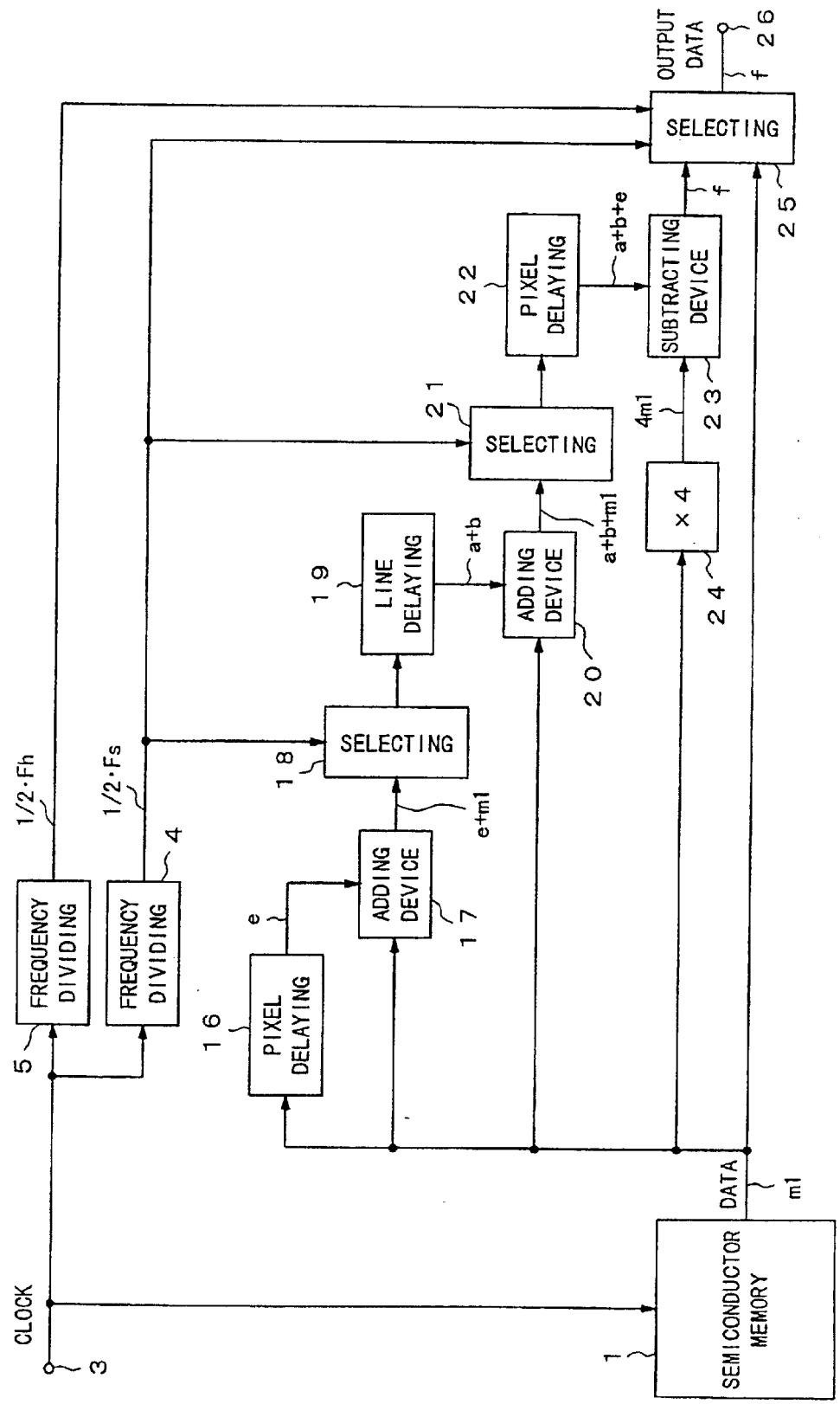

Fig. 12

HIERARCHICAL IMAGE PROCESSOR FOR ENCODING OR DECODING, AND MEMORY ON THE SAME CHIP

BACKGROUND OF THE INVENTION

1. Field of the Invention

The present invention relates to a memory apparatus for a digital picture signal, the memory apparatus having a real time signal processing circuit in particular a hierarchical encoding circuit disposed in an IC circuit, a writing method thereof, and a reading method thereof.

2. Description of the Related Art

A hierarchical encoding process for generating picture signals in a plurality of hierarchical levels that differ in resolutions is known. In this process, a picture in a first hierarchical level, a picture in a second hierarchical level, a picture in a third hierarchical level, and so forth are formed in such a manner that the data in the first hierarchical level is a high resolution picture signal, the resolution of the data in the second hierarchical level is lower than the resolution of the data in the first hierarchical level, the resolution of the data in the third hierarchical level is lower than the resolution of the data in the second hierarchical level. In this process, a plurality of picture signals are transmitted through one transmission path (a communication path or a record medium). With picture monitors corresponding to the hierarchical levels on the receiving side, picture data can be reproduced.

More reality, they are video signals having different resolutions such as a standard resolution video signal, a high resolution video signal, a computer display picture data, and a lower resolution video signal (for searching a picture database at high speed). In addition to the variations of resolutions, the hierarchical encoding process can be applied to enlargement and reduction of pictures (namely, electronic zooming). The enlargement and reduction of pictures have been widely used for video game applications and so forth.

In the conventional hierarchical encoding process, when a picture signal in a first hierarchical level and a picture signal in a second hierarchical level whose pixels are ¼ of the picture signal in the first hierarchical level are formed, the picture signal in the first hierarchical level is thinned out to ¼ thereof so as to form the picture signal in the second hierarchical level. In addition, the picture signal in the second hierarchical level is interpolated so as to form an interpolation signal in the first hierarchical level. The difference between the interpolation signal in the first hierarchical level and the input picture signal is calculated so as to form a difference signal. The difference signal is transmitted. Thus, in the conventional hierarchical encoding process, the number of pixels of the difference signal is the same as the number of pixels of the input picture signal. In addition, the signal in the second hierarchical level is transmitted. Thus, the amount of data to be transmitted is larger than the amount of original data. When hierarchically structured data is written to a memory, the capacity of the memory should be increased. To solve such a problem, the inventors of the present invention have proposed another hierarchical encoding method that does not increase the amount of data to be transmitted.

However, when hierarchically structured picture data is written to a memory, another IC circuit that is a signal processing circuit for the hierarchical encoding process is required. Thus, the cost and space of the resultant circuit increase.

OBJECTS AND SUMMARY OF THE INVENTION

Therefore, an object of the present invention is to provide a memory apparatus that can store hierarchically structured picture data whose amount of data is the same as the amount of original input picture data and can reduce the cost and space of an IC circuit, a writing method thereof, and a reading method thereof.

According to the present invention, a signal processing means for processing an input digital picture signal on the real time basis and a memory means for storing output data of the processing means are disposed on a common semiconductor substrate.

As an example, the signal processing means performs the hierarchical encoding process for forming a pixel in the second hierarchical level with an average value of N pixels in the first hierarchical level that is an input digital picture signal. The memory means stores (N−1) pixels in the first hierarchical level and one pixel in the second hierarchical level. In addition, the present invention is a method for writing data to the memory in the above-described manner.

The signal processing means is adapted for performing a hierarchical decoding process, corresponding to a hierarchical encoding process, for generating at least data in a first hierarchical level and data in a second hierarchical level with the input picture data, the data in the first hierarchical level being different from the data in the second hierarchical level in resolutions and restoring data in the first hierarchical level that has not been written to the memory means with the data in the first hierarchical level and the data in the second hierarchical level being read from the memory means. In addition, the present invention is a reading method for reading data in such a manner.

In the first embodiment of the present invention, the hierarchical encoding process is accomplished by an average value calculating means for forming the data in the second hierarchical level with the average value of every N pixels of the data in the first hierarchical level and a means for outputting (N−1) pixels of the data in the first hierarchical level and one pixel of the data in the second hierarchical level to the memory means.

In the second embodiment of the present invention, the hierarchical encoding process is accomplished by an average value calculating means for forming the data in the second hierarchical level with the average value of every N pixels of the data in the first hierarchical level, a difference data generating means for generating (N−1) difference values between the average value of the data in the second hierarchical level and the data in the first hierarchical level, and a means for outputting the (N−1) difference values in the first hierarchical level received from the difference data generating means and the data in the second hierarchial level received from the average value calculating means to the memory means.

In the third embodiment of the present invention, the memory apparatus for a digital picture signal has a controlling means for controlling the arithmetic operation means and the memory means in such a manner that the controlling means reads data from the memory means, performs an arithmetic operation for the data, and writes the resultant data to the memory means so as to form the data in the first hierarchical level.

According to the present invention, data in the higher hierarchial level is formed of an average value of a plurality of pixels in a predetermined hierarchical level. A part of pixels in the higher hierarchical level instead of pixels in the predetermined hierarchical level is written to the memory. Data in each hierarchical level can be obtained from a read output of the memory. Thus, when data in a plurality of hierarchical levels is written to the memory, the required capacity of the memory does not increase from the required capacity of the memory for the original picture data. In addition, the signal processing circuit and the semiconductor memory can be structured as one chip IC circuit.

In addition, according to the third embodiment of the present invention, since data necessary for forming average value data is read from the memory, the signal processing circuit does not need to have a pixel delaying circuit and a line delaying circuit. Thus, the scale of the hardware can be reduced.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 4 is a block diagram showing a structure of a reading side according to a second embodiment of the present invention;

FIG. 12 is a timing chart showing an operation of the fourth embodiment of the present invention.

DETAILED DESCRIPTION OF THE PREFERRED EMBODIMENTS

According to the present invention, both a signal processing circuit that preforms a signal process on the real time basis and a semiconductor memory are structured on a common semiconductor substrate as one chip IC circuit. According to an embodiment of the present invention, a signal processing circuit that performs a hierarchical encoding process and a hierarchical decoding process for a picture signal and a semiconductor memory (RAM) are structured as one chip IC circuit.

Figure 1:
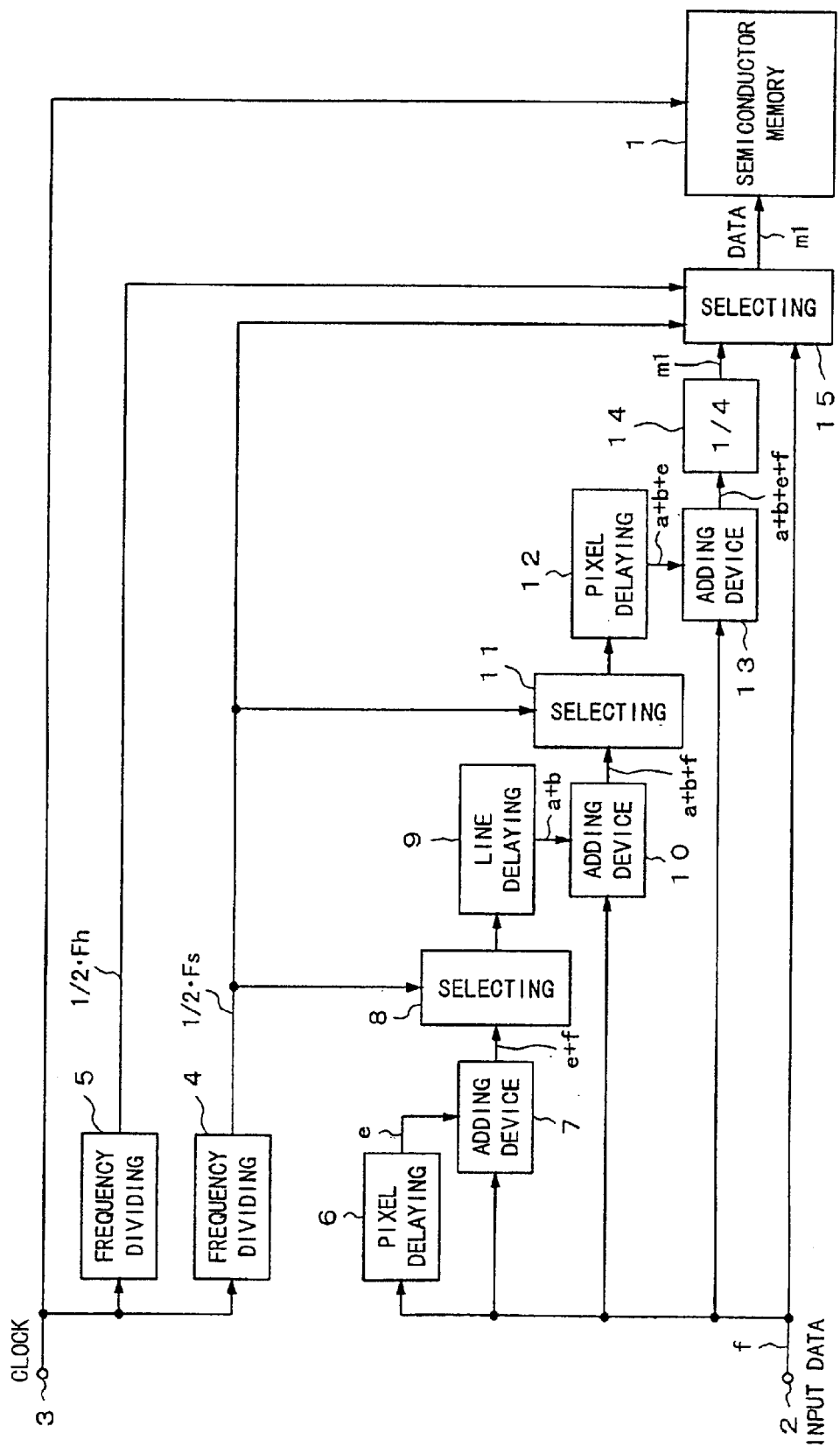
FIG. 1 is a block diagram showing a structure of a writing side according to a first embodiment of the present invention.

Next, with reference to the accompanying drawings, a first embodiment of the present invention will be described. In FIG. 1, a signal processing circuit that performs a hierarchical encoding process and a semiconductor memory 1 are structured as one chip IC. Picture data that has been sampled at a predetermined sampling frequency (for example, 13.5 MHz) and where one sample has been quantized with a predetermined number of bits (for example, eight bits) is supplied from an input terminal 2. A clock signal that synchronizes with the input picture data is supplied from an input terminal 3. The input picture data is supplied in the TV raster scanning sequence.

The first embodiment of the present invention has a minimum number of hierarchical levels that are a first hierarchical level and a second hierarchial level. Data in the first hierarchical structure is input picture data. The resolution of the data in the second hierarchical level is lower than the resolution of the data in the first hierarchical level. However, with reference to FIG. 2, the hierarchical encoding process will be described in a structure having a first hierarchical level, a second hierarchical level, and a third hierarchical level.

Figure 2:
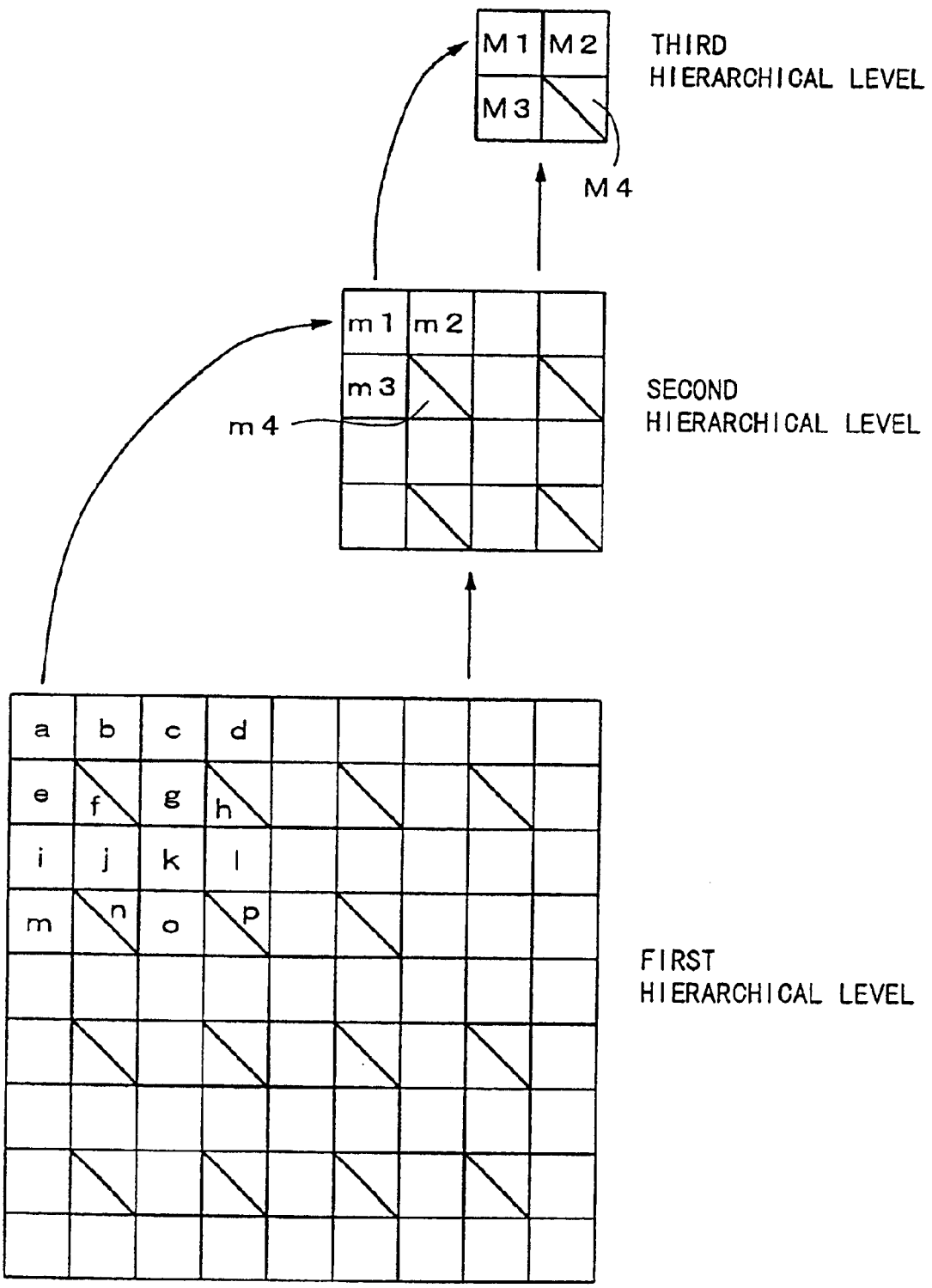
FIG. 2 is a schematic diagram for explaining a hierarchical encoding process according to the first embodiment of the present invention.

In FIG. 2, a partial picture (8×8 pixels) in the first hierarchical level is shown as the lowest position. In FIG. 2, each square represents one pixel. An average value of every four pixels (2×2 pixels) in the first hierarchical level is calculated. For example, an average value m1 of a, b, e, and f is calculated (m1=¼·(a+b+e+f)). Thus, the portion corresponding to the (8×8 pixels) is thinned out to (4×4 pixels). With the average values calculated in such a manner, a picture in the second hierarchical level is formed.

Next, an average value of (2×2) pixels that are spatially adjacent in the second hierarchical level is calculated. In FIG. 2, an average value M1 is shown as {M1 =¼·(m1+ m2+m3+m4)}. With the average values calculated in such a manner, a picture in the third hierarchical level is formed. Thus, the region of (8×8 pixels) of the input picture is thinned out to a region of (2×2 pixels) in the third hierarchical level. When an average value is calculated in the above-described manner, a picture in a higher hierarchical level than above can be formed. As is clear from FIG. 2, as the hierarchical level increases, the number of pixels decreases as in ¼, ¹⁄₁₆, and so forth. In other words, when the area of a picture is constant, the resolution of the picture decreases in the similar ratio. When the distance between pixels is constant, the size of the picture decreases in the similar ratio.

In the hierarchical encoding process for forming a picture in a higher hierarchical level with average values of a picture in a lower hierarchical level, when pictures in a plurality of hierarchical levels are transmitted, the number of pixels transmitted does not increase. In the example shown in FIG. 2, instead of pixels with slant lines, a pixel in the higher hierarchical level is transmitted. For example, instead of a pixel f in the first hierarchical level, a pixel m1 in the second hierarchical level is transmitted. The pixel f that is not transmitted is obtained as {f=4·m1−(a+b+e)} on the receiving side. In addition, instead of a pixel p at the lower right corner of (4×4 pixels) including pixels a to f in the first hierarchical level (or a pixel m4 in the second hierarchical level), a pixel M1 in the third hierarchical level is transmitted. As with the above-described manner, the pixel m4 in the second hierarchical level can be decoded. In addition, the pixel p in the first hierarchical level can be decoded. It should be noted that the position of a pixel that is omitted is not limited to the lower right corner position.

Returning to FIG. 1, the first embodiment of the present invention will be described. The clock signal that synchronizes with the input data and that is input from the input terminal 3 is supplied to frequency dividing circuits 4 and 5. The frequency dividing circuits 4 and 5 each divide the frequency of the clock signal by 2. Assuming that the sampling frequency is denoted by Fs, the frequency dividing circuit 4 generates a clock signal with a frequency of ½·Fs. Likewise, assuming that the horizontal scanning frequency is denoted by Fh, the frequency dividing circuit 5 generates a clock signal with a frequency of ½·Fh.

The input picture data is supplied to a one-pixel delaying circuit 6, an adding device 7, an adding device 10, an adding device 13, and a selecting circuit 15. The output data of the one-pixel delaying circuit 6 is supplied to the adding device 7. The output data of the adding device 7 is supplied to a one-line delaying circuit 9 through a selecting circuit 8. The adding device 10 adds the input data and the output data of the line delaying circuit 9. The output data of the adding device 10 is supplied to one-pixel delaying circuit 12 through a selecting circuit 11. The adding device 13 adds the input data and the output data of the one-pixel delaying circuit 12.

The output data of the adding device 13 is supplied to a selecting circuit 15 through a dividing circuit 14 that performs a divide-by-4 operation. The selecting circuit 15 selects the input data or the output data of the dividing circuit 14. The output data of the selecting circuit 15 is supplied as write data to the semiconductor memory 1. The clock signal is supplied from the input terminal 3 to the semiconductor memory 1. A write address and a read address (not shown) are generated using the clock signal. In addition, a control signal for controlling the writing operation and the reading operation is generated using the clock signal.

The ½·Fs clock signal is supplied from the frequency dividing circuit 4 to the selecting circuits 8 and 11. The selecting circuits 8 and 11 select and output the output data of the adding devices 7 and 10 at intervals of every two pixels corresponding to the frequency divided clock signal, respectively. Thus, the output data of the selecting circuits 8 and 11 varies at intervals of every two pixels. The clock signal with the frequency of ½·Fs and the clock signal with the frequency of ½·Fh are supplied from the frequency dividing circuits 4 and 5 to the selecting circuit 15. Thus, the selecting circuit 15 alternately selects the input data or the output data of the dividing circuit 14 at intervals of every line. At the intervals of every lines for which the output data of the dividing circuit 14 is selected, the output data of the selecting circuit 15 is selected at intervals of every two pixels. Thus, the output data of the selecting circuit 15 on the selected line varies at intervals of every two pixels.

Figure 3:
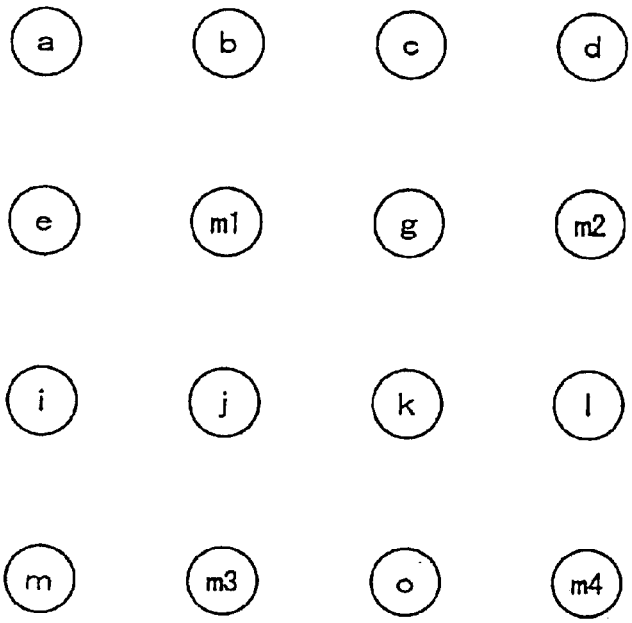
FIG. 3 is a schematic diagram showing a part of data written to a semiconductor memory according to the first embodiment of the present invention.

Next, the operation of the first embodiment of the present invention will be described. For example, in the case that pixels are disposed as shown in FIGS. 2 and 3, when a pixel f is supplied to the input terminal 2, each circuit shown in FIG. 1 generates output data. The output data of the one-pixel delaying circuit 6 is a pixel e. Thus, the output data of the adding device 7 is pixels (e+f). The selecting circuit 8 selects the output data of the adding device 7 at intervals of every two pixels.

The pixels (e+f) are selected data. Thus, after one pixel, added pixels (f+g) are not selected data. Consequently, the one-line delaying circuit 9 generates added pixels (a+b) that are pixels one line before. Consequently, the adding device 10 generates added pixels (a+b+f).

The selecting circuit 11 that receives the output data of the adding device 10 selects the output data of the adding device 10 at intervals of every two pixels and supplies the selected output data to the one-pixel delaying circuit 12 at the same timing (in the same phase) as the selecting circuit 8. The one-pixel delaying circuit 12 generates pixels (a+b+e). The adding device 13 adds the pixels (a+b+e) and the input pixel f and generates added pixels (a+b+e+f). The dividing circuit 14 converts the output data of the adding device 13 into a pixel m1=¼·(a+b+e+f). The selecting circuit 15 selects the average value data as the pixel m1 instead of the input pixel f and supplies the pixel m1 to the semiconductor memory 1. In the semiconductor memory 1, the average value as the pixel m1 is written to an address for the pixel f.

As shown in FIG. 3, average values as the pixels m1, m2, m3, and so forth in the second hierarchical level are written to lower right corners of (2×2 pixel) regions of the semiconductor memory 1. Thus, data in the first hierarchical level and data in the second hierarchical level generated with input pixels on the real time basis can be written to the semiconductor memory 1 without need to increase the capacity thereof.

FIG. 4 shows an example of the structure of a reading side of the semiconductor memory 1. A sampling clock that synchronizes with read data of the semiconductor memory 1 is supplied from an input terminal 3. Frequency dividing circuits 4 and 5 form a clock signal with a frequency of ½·Fs and a clock signal with a frequency of ½·Fh, respectively. Data read from the semiconductor memory 1 is supplied to a one-pixel delaying circuit 16, an adding device 17, an adding device 20, a multiply-by-4 circuit, and a selecting circuit 25.

The structure of the reading side is similar to the structure of the writing side shown in FIG. 1. In other words, the one-pixel delaying circuit 16, the adding device 17, the selecting circuit 18, the adding device 20, the selecting circuit 21, the one-pixel delaying circuit 22, and the selecting circuit 25 shown in FIG. 4 correspond to the one-pixel delaying circuit 6, the adding device 7, the selecting circuit 8, the adding device 10, the selecting circuit 11, the one-pixel delaying circuit 12, and the selecting circuit 15, respectively. Although the adding device 13 is disposed on the writing side, a subtracting device 23 is disposed on the reading side as shown in FIG. 4. In addition, although the adding device 13 and the dividing circuit 14 are disposed on the writing side, a subtracting device 23 and the multiply-by-4 circuit 24 are disposed on the reading side.

In the above-described structure of the reading side, when the pixel m1 in the second hierarchical level instead of the pixel f is read from the semiconductor memory 1, each circuit shown in FIG. 4 generates output data. The operation of the reading side is similar to the operation of the writing side shown in FIG. 1. The multiplying circuit 24 generates data (4×m1). The subtracting device 23 performs a subtracting operation {4×m1−(a+b+e)}. Thus, the subtracting device 23 generates the pixel f. The pixel f is selected by the selecting circuit 25 and then obtained from an output terminal 26.

Thus, the output terminal 26 generates a pixel in the first hierarchical level. When a pixel in the second hierarchical level is output, a selecting circuit that selects only data in the second hierarchical level from the read output of the semiconductor memory 1 is disposed. In addition, data in the first hierarchical level and data in the second hierarchical level can be read in parallel. As described above, the structure on the writing side shown in FIG. 1 is almost similar to the structure on the reading side shown in FIG. 4. In addition, the hardware structure of the adding device 13 is the same as the hardware structure of the subtracting device 23. The hardware structure of the dividing circuit 14 is the same as the hardware structure of the multiplying circuit 24 except for the direction of two-bit shifting operation. Thus, the writing side and the reading side can be accomplished as common hardware. Consequently, the scale of hardware that performs the hierarchical encoding process and the hierarchical decoding process can be reduced.

Figure 5:
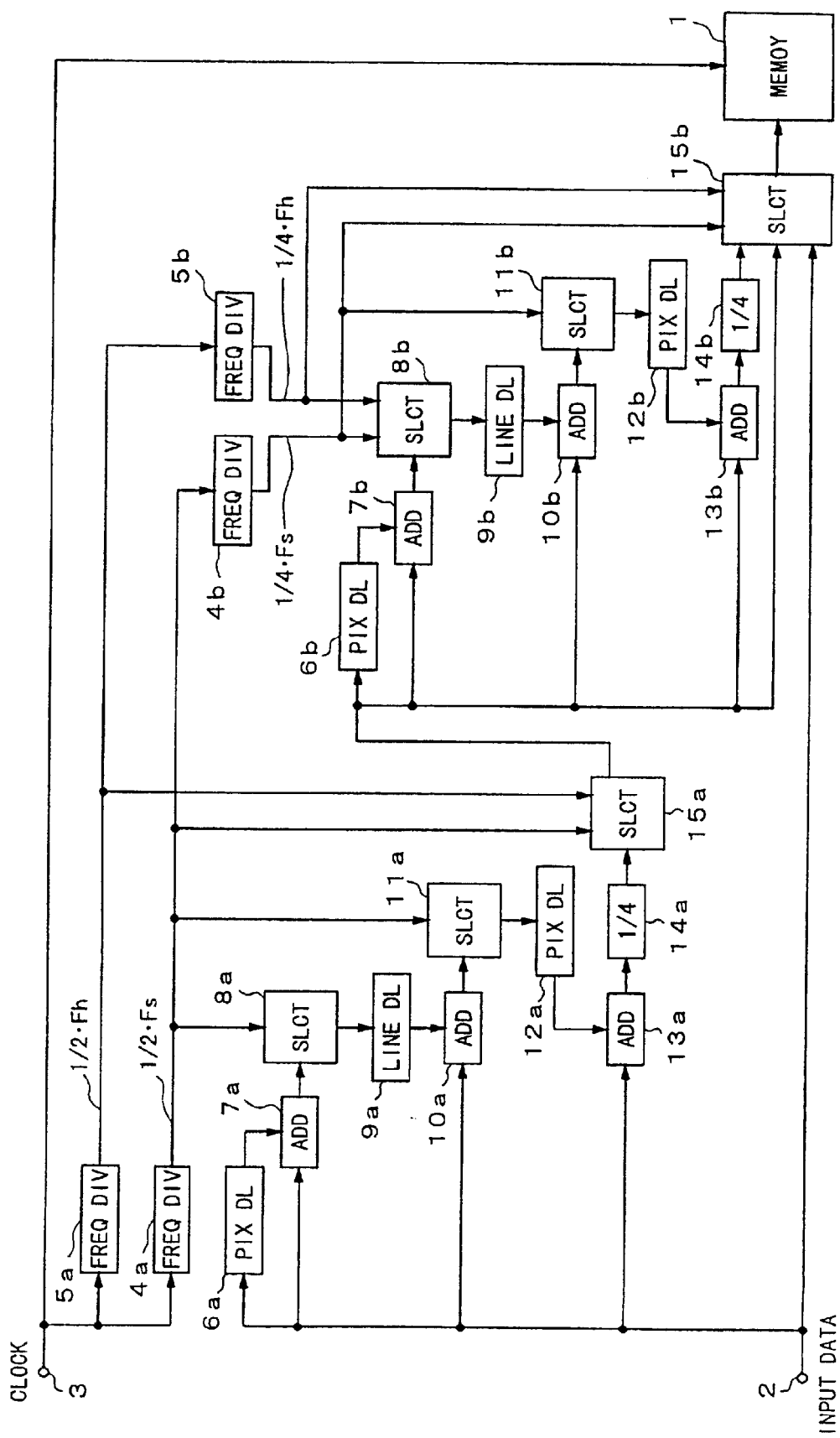
FIG. 5 is a block diagram showing a structure of a writing side according to the second embodiment of the present invention.

FIG. 5 is a block diagram showing a second embodiment of the present invention. FIG. 5 shows a structure of a signal process for writing encoded data in three hierarchical levels to a semiconductor memory 1. In the second embodiment, the structure for forming data in the second hierarchical level with data in the first hierarchical level (input picture data) is the same as the structure shown in FIG. 1. Thus, in FIG. 5, similar portions to those shown in FIG. 1 are denoted by similar reference numerals with suffix a and their description is omitted. However, in the second embodiment, only the output data of a dividing device 14a is supplied to a selecting circuit 15a. The selecting circuit 15a outputs data in the second hierarchical level (namely, pixels m1, m2, m3, m4, and so forth).

To encode data in the third hierarchical level, a frequency dividing circuit 4b is connected to a frequency dividing circuit 4a. In addition, a frequency dividing circuit 5b is connected to a frequency dividing circuit 5a. The frequency dividing circuit 4b generates a clock signal with a frequency of ¼·Fs. The frequency dividing circuit 5b generates a clock signal with a frequency of ¼·Fh. The clock signal with the frequency of ¼·Fs and the clock signal with the frequency of ¼·Fh are supplied to selecting circuits 8b and 15b, respectively.

Input picture data (data in the first hierarchical level) and data in the second hierarchical level received from a selecting circuit 15a are supplied to a selecting circuit 15b. The output data of the selecting circuit 15b is written to the semiconductor memory 1. In addition, data in the second hierarchical level is supplied to a two-pixel delaying circuit 6b, an adding device 7b, an adding device 10b, and an adding device 13b. In the similar structure for forming data in the second hierarchical level, the two-pixel delaying circuit 6b, the adding device 7b, a selecting circuit 8b, a two-line delaying circuit 9b, the adding device 10b, a selecting circuit 11b, a two-pixel delaying circuit 12b, the adding device 13b, a dividing circuit 14b, and a selecting circuit 15b are disposed. When a pixel p is supplied to the input terminal 2, the dividing circuit 14b generates a pixel M1 in the third hierarchical level {M1=¼·(m1+m2+m3+m4)}. The selecting circuit 15b selects the pixel M1 instead of the pixel p and supplies the selected pixel M1 to the semiconductor memory 1.

Figure 6:
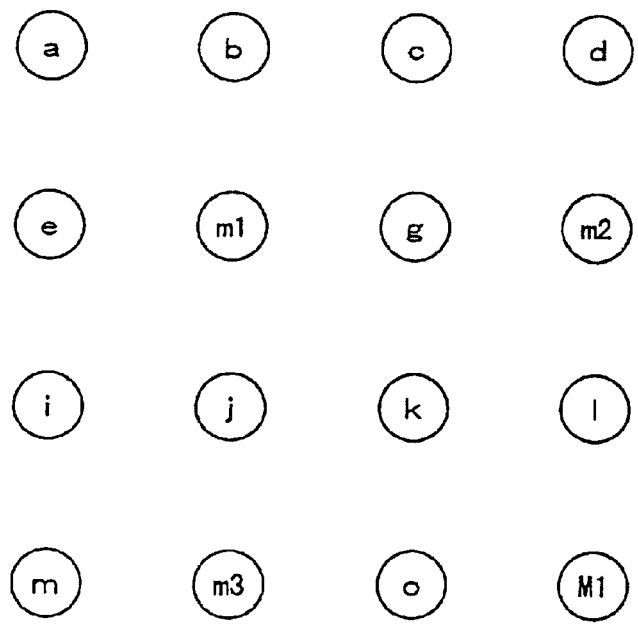
FIG. 6 is a schematic diagram showing a part of data written to a semiconductor memory according to the second embodiment of the present invention.

The selecting circuit 15b selects data in the second hierarchical level received from the selecting circuit 15a or the input data corresponding to the predetermined timings. Thus, as shown in FIG. 6, pixels m1, m2, m3, and so forth in the second hierarchical level instead of pixels in the first hierarchical level are written to individual regions of (2×2 pixels). Pixels M1, M2, and so forth in the third hierarchical level instead of pixels in the second hierarchical level are written to individual regions of (4×4 pixels). Although not shown, the structure for reading data from the semiconductor memory 1 can be composed similar to the structure on the writing side.

Figure 7:
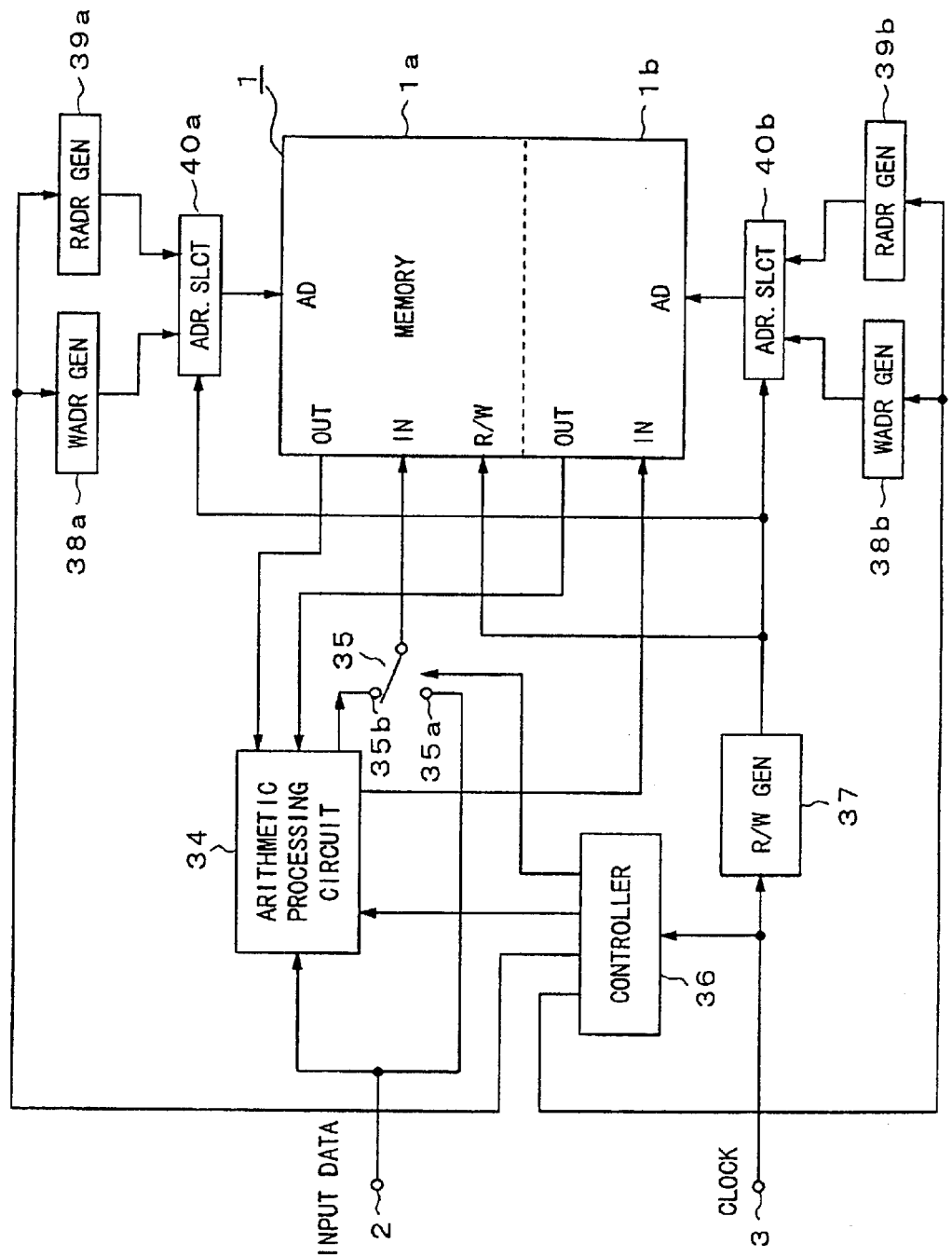
FIG. 7 is a block diagram showing a structure of a writing side according to a third embodiment of the present invention.

Next, with reference to the accompanying drawings, a third embodiment of the present invention will be described. FIG. 7 shows a structure of a one-chip IC having a signal processing circuit that performs a hierarchical encoding process and a semiconductor chip 1. For simplicity, in FIG. 7, similar portions to those in FIG. 1 are denoted by similar reference numerals and their description is omitted.

In the third embodiment, the semiconductor memory 1 is composed of memories 1a and 1b. The memories 1a and 1b are composed of different memories or by dividing the memory space of one memory into two portions. The memory 1a stores data in the first and third hierarchical levels. The memory 1b stores data in the second hierarchical level. The memories 1a and 1b each have data input/output terminals, an address input terminal, and R/W signal input terminals (for controlling the reading/writing operations).

Input picture data is supplied to an arithmetic operation circuit 34 and an input terminal 35a of a switch circuit 35. The output data of the arithmetic operation circuit 34 is supplied to an input terminal 35b of the switch circuit 35. The output data selected by the switch circuit 35 is supplied to a data input terminal IN of the memory 1a. Data read from the memories 1a and 1b is supplied to the arithmetic operation circuit 34. As will be described later, the arithmetic operation circuit 34 performs an adding process and an average calculating process for calculating average value data. A dividing process necessary for the average calculating process is a divide-by-4 process, a divide-by-16 process, or the like. The dividing process can be performed by a bit shifting operation.

A clock signal is supplied from an input terminal 3 to a controller 36, a R/W signal generating circuit 37, write address generating circuits 38a and 38b, and read address generating circuits 39a and 39b. A R/W signal is supplied from the R/W signal generating circuit 37 to a R/W input terminal of the memory 1 and address selectors 40a and 40b. When the writing operation is performed, a write address is selected by the address selectors 40a and 40b. When the reading operation is performed, read addresses are selected by the address selectors 40a and 40b. The read addresses are supplied to the memory 1. Although connection lines are omitted, the clock signal is also supplied to the address generating circuits 38a, 38b, 39a, and 39b.

The controller 36 controls the write address generating circuits 38a and 38b and the read address generating circuits 39a and 39b and generate addresses necessary for the arithmetic operations. In addition, the controller 36 controls the arithmetic operation circuit 34 so as to control the arithmetic operations. Moreover, the controller 36 controls the switch circuit 35 so as to select data to be written to the memories 1a and 1b.

Figure 8:
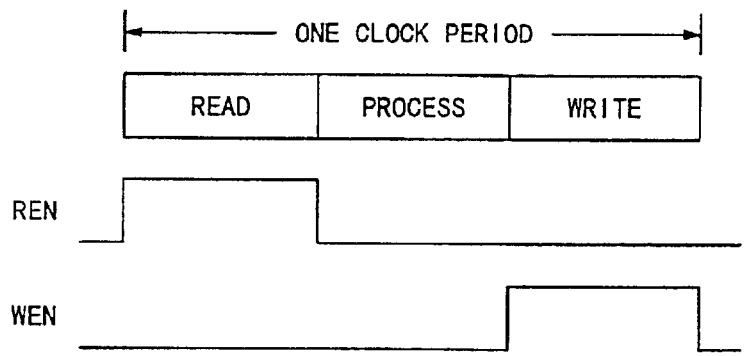
FIG. 8 is a schematic diagram for explaining a memory controlling process according to the third embodiment of the present invention.

Next, the operation of the third embodiment of the present invention will be described. As shown in FIG. 8, the memories 1a and 1b successively perform a reading operation, an arithmetic operation (adding operation), and a writing operation at every clock cycle. When the reading operation and the writing operation are performed, a read enable signal REN and a write enable signal WEN become high in intervals of the reading operation and the writing operation, respectively. Thus, control signals (R/W signals) corresponding to the write enable signal WEN and the read enable signal REN are formed.

Figure 9A:
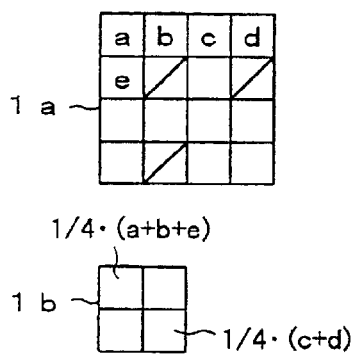
FIGS. 9A to 9D are schematic diagrams showing part of data written to a semiconductor memory according to the third embodiment of the present invention.

As an example, with reference to FIGS. 9A to 9D, the hierarchical encoding process for pixels disposed as shown in FIG. 2 will be described. When input pixels a, b, c, d, and so forth are supplied, the switch circuit 35 selects the input pixels and supplies them to the memory 1*a*. As shown in FIG. 9A, pixels a, b, c, d, e, g, and so forth other than pixels f, h, n, and so forth corresponding to positions of data in the second hierarchical level are successively written to the memory 1*a*. In the writing operation for the pixels a, b, c, d, e, g, and so forth, it is not necessary to read data from the memory 1*a*. Thus, the reading operation of the memory 1*a* in one cycle of the memory operation shown in FIG. 8 is not enabled. For simplicity, FIGS. 9(A) to (D) each show a part of memory regions of the memories 1*a* and 1*b*.

Figure 9B:
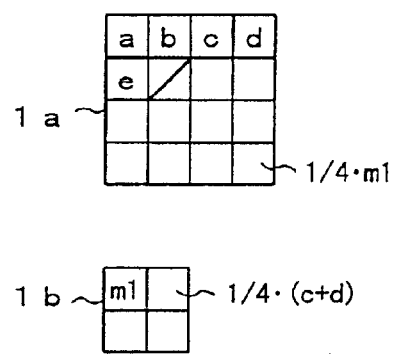

On the other hand, added output data of the arithmetic operation circuit 34 is written to the memory 1*b*. In the operation of the memory cycle shown in FIG. 8, data of an address to which data (for example, a pixel m1) in the second hierarchical level is read from the memory 1*b*. The read data and divided data of which the input pixel data has been divided by 4 are added. The added output data is written to the same address of the memory 1*b*. When the pixel f is input, as shown in FIG. 9A, data $\{¼·(a+b+e)\}$ has been stored at an address to which the pixel m1 is written. Thus, the data $\{¼·(a+b+e)\}$ is read and then supplied to the arithmetic operation circuit 34. The arithmetic operation circuit 34 adds the input pixel data ¼·f and the read data and generates data $\{¼·(a+b+e+f)\}$ as the pixel m1. The pixel m1 is written to the same address of the memory 1*b*. FIG. 9B shows the state of which the pixel m1 has been written to the memory 1*b*.

After pixels such as a, b, e, and so forth are written to the memory 1*b*, these pixels may be divided by 4. However, to prevent the required capacity of the memory from increasing, before these pixels are written to the memory 1*b*, they should be divided by 4.

On the other hand, the position of the switch circuit 35 is changed. As shown in FIG. 9B, instead of the input pixel f, data of which the pixel m1 in the second hierarchical level generated from the arithmetic operation circuit 34 has been divided by 4 is written to an address (the position of pixel data p) for a pixel M1 in the third hierarchical level. Thus, it is not necessary to write the pixels m1, m2, and so forth (with slant lines) in the second hierarchical level to the memory 1*a*. Thus, the required capacity of the memory does not increase.

Figure 9C:
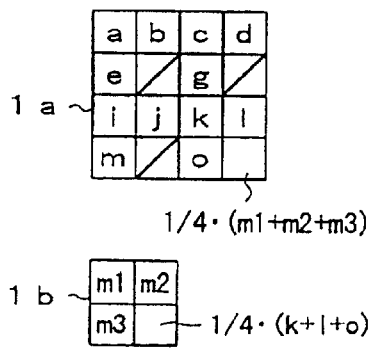

The above-described operation is repeated. When the input pixel p is input, as shown in FIG. 9C, in the memory 1*b*, data $\{¼·(k+l+o)\}$ has been stored at an address for the pixel m4. Thus, this data is read and supplied to the arithmetic operation circuit 34. The arithmetic operation circuit 34 adds divided data of which the input pixel p has been divided by 4 and the read data and generates data $\{¼·(k+l+o+p)\}$ as a pixel m4.

Figure 9D:
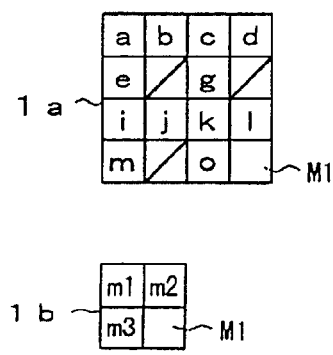

On the other hand, in the memory 1*a*, data $\{¼·(m1+m2+m3)\}$ has been stored at an address (the position of pixel p) for data in the third hierarchical level. Thus, this data is read and supplied to the arithmetic operation circuit 34. The arithmetic operation circuit 34 adds the read data and divided data of which the pixel m4 has been divided by 4 and generates data $\{¼·(m1+m2+m3+m4)\}$ as a pixel M1. The position of the switch circuit 35 is changed. As shown in FIG. 9D, instead of the input pixel p, the pixel M1 in the third hierarchical level generated from the arithmetic operation circuit 34 is written to the same address of the memory 1*a*. Likewise, in the memory 1*b*, the pixel M1 (or m4) is written to an address for the pixel m4. FIG. 9D shows the state of which the pixel M1 has been written to the memories 1*a* and 1*b*. Thus, since data in the third hierarchical level is written to the memory 1*a*, the required capacity of the memory 1*a* slightly increases.

The structure of a reading side (not shown) of the third embodiment may be similar to the structure of the writing side shown in FIG. 7. Thus, the writing side and the reading side can be accomplished as common hardware. Consequently, the scale of the hardware for performing the hierarchical encoding process and the hierarchical decoding process can be reduced.

Figure 10:
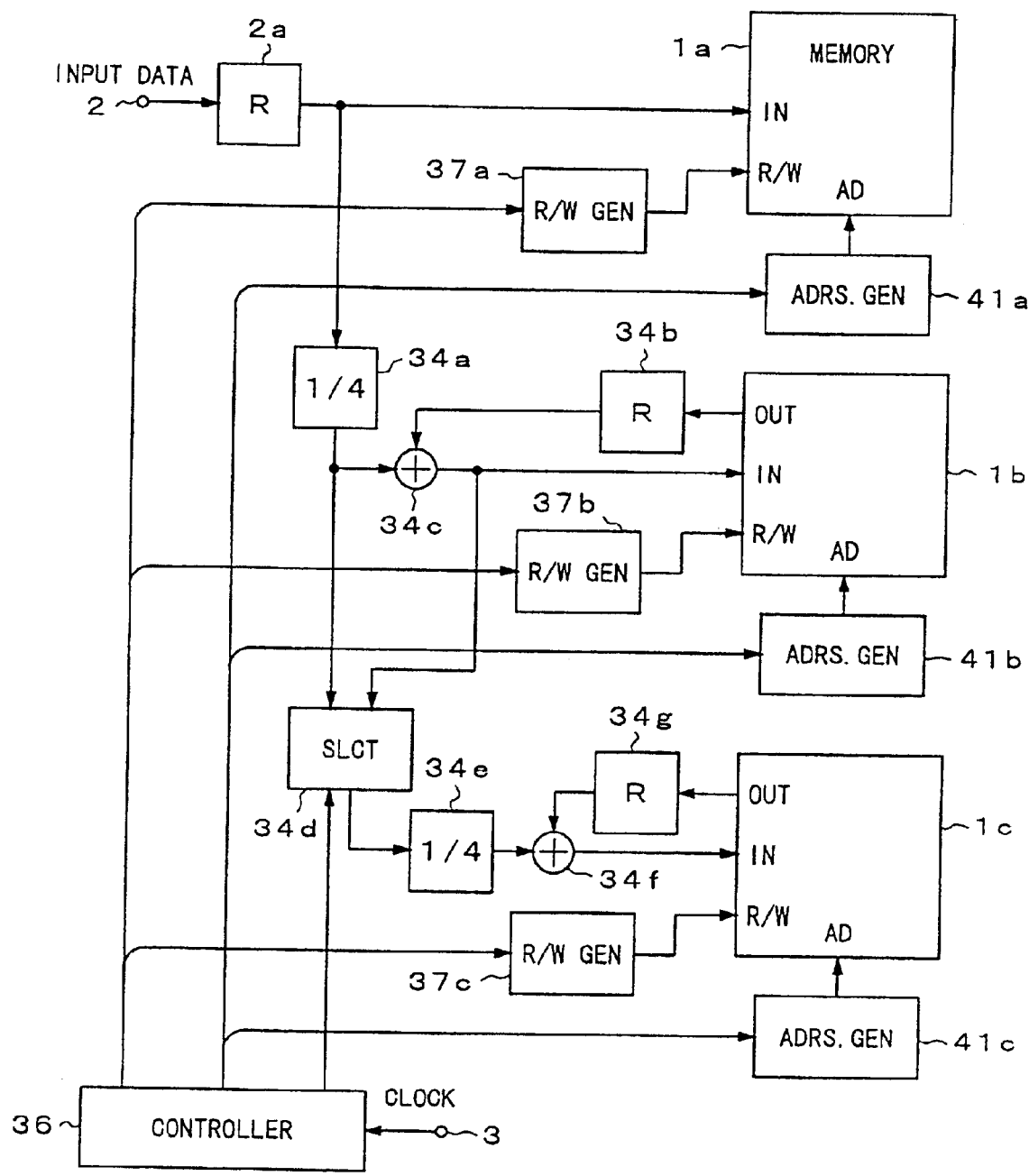
FIG. 10 is a block diagram showing a structure of a writing side according to a fourth embodiment of the present invention.

FIG. 10 is a block diagram showing a structure of a fourth embodiment of the present invention. For simplicity, in FIG. 10, similar portions to those in FIG. 7 are denoted by similar reference numerals and their description is partly omitted.

In FIG. 10, a semiconductor memory 1 is divided into three memories 1*a*, 1*b*, and 1*c* to which encoded data in three hierarchical levels is written. In association with the memories 1*a*, 1*b*, and 1*c*, R/W signal generating circuits 37*a*, 37*b*, and 37*c* and address generating circuits 41*a*, 41*b*, and 41*c* are disposed. A control signal is supplied from a controller 36 to the R/W signal generating circuits 37*a*, 37*b*, and 37*c* and the address generating circuits 41*a*, 41*b*, and 41*c*. The contents of the memories 1*a*, 1*b*, and 1*c* have been initially cleared.

Input data is supplied from an input terminal 2 to the memory 1*a* through an input register 2*a*. Data in the first hierarchical level (namely, input picture data) is written to the memory 1*a* as it is. However, input pixels f, h, p, and so forth for addresses corresponding to data in the second and third hierarchical levels are not written to the memory 1*a*. The required capacity of the memory 1*a* is ¾ the required capacity in the case that the memory 1*a* stores all input picture data.

The output data of an adding device 34*c* is supplied as input data to the memory 1*b*. The input picture data received from the register 2*a* is supplied to one input terminal of the adding device 34*a* through a divide-by-4 circuit 34*a*. Data read from the memory 1*b* is supplied to the other input terminal of the adding device 34*c* through a register 34*b*. The memory 1*b* has addresses corresponding to positions of data in the second hierarchical level (namely, pixels f, h, n, and so forth). Pixels m1, m2, m3, and so forth in the second hierarchical level are written to these addresses. Thus, the required capacity of the memory 1*b* is 3/16 the required capacity in the case that the memory 1*b* stores all input pixels.

In addition, the output data of the dividing circuit 34*a* and the output data of the adding device 34*c* are supplied to a selector 34*d*. The output data of the selector 34*d* is supplied to one input terminal of an adding device 34*f* through a divide-by-4 circuit 34*e*. Data read from the memory 1*c* is supplied to the other input terminal of the adding device 34*f* through a register 34*g*. The output data of the adding device 34*f* is supplied to the memory 1*c*. The memory 1*c* has addresses corresponding to positions of data in the third hierarchical layer (namely, the pixel p and so forth). Pixels M1, M2, M3, and so forth in the third hierarchical level are written to these addresses. Thus, the required capacity of the memory 1*c* is 1/16 the required capacity in the case that the memory 1*c* stores all input pixels. Thus, the total capacity of the memories 1*a*, 1*b*, and 1*c* is (¾+3/16+1/16=1). Consequently, the required capacity does not increase in comparison with the case that the memory stores original input picture data.

Figure 11A:
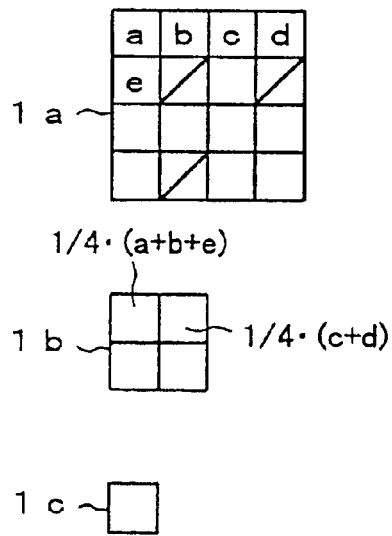
FIGS. 11A to 11D are schematic diagrams showing a part of data written to a semiconductor memory according to the fourth embodiment of the present invention.

FIGS. 11A to 11D are schematic diagrams for explaining the operation of the fourth embodiment. FIG. 11A register 2*a* generates the pixel f of input data. The memory 1*b* has stored added output data $\{¼·(a+b+e)\}$. A cycle of the reading operation, the adding operation by the adding device 34*c*, and the writing operation for the added output data to the same address is performed. Thus, the added output data is read. The adding device 34c adds the added output data and pixel data {¼·f} and generates data in the second hierarchical level {¼·(a+b+e+f)} as a pixel m1. The pixel m1 is written to the same address of the memory 1b and also supplied to the dividing circuit 34e through the selector 34d.

Figure 11B:
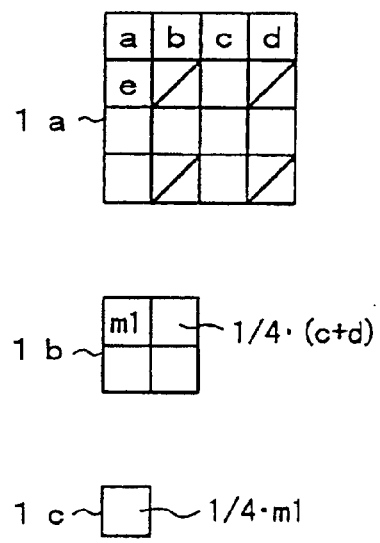
Figure 11C:
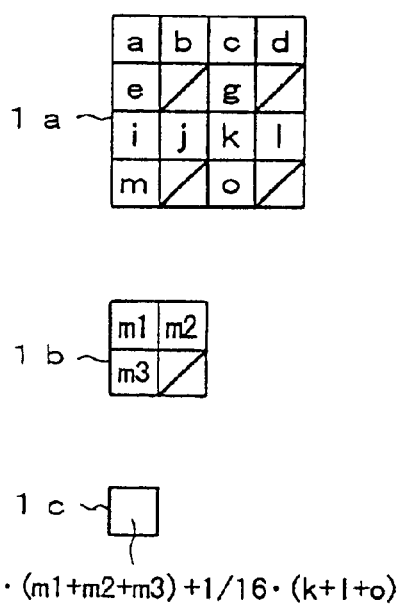
Figure 11D:
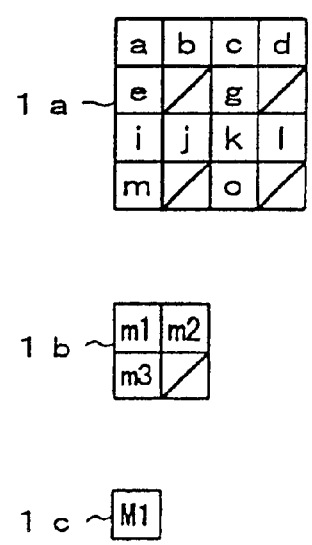

The output data of the dividing circuit 34e is supplied to the adding device 34f. The adding device 34f adds the output data of the dividing circuit 34e and data read from the memory 1c (in this case, zero data). The added data is written to the same address of the memory 1c. Thus, as shown in FIG. 11B, data {¼·m1} is written to the memory 1c. Thereafter, the similar operation is repeated. When the register 2a generates a pixel p, data as shown in FIG. 11C has been stored in the memories 1a, 1b, and 1c.

Since a pixel m4 in the second hierarchical level is not written to the memory 1b, the selector 34d selects pixels k, l, and o necessary for forming the pixel m4. The dividing circuits 34a and 34e divide the pixels k, l, and o by 16 and supplies the divided output data to the adding device 34f. The output data of the adding device 34f is written to an address for a pixel M1 in the third hierarchical level. Thus, the memory 1c has stored data {¼·(m1+m2+m3)+1/16·(k+l+o)}.

The adding device 34f adds data (1/16·p) and data read from the memory 1c and forms the pixel M1 in the third hierarchical level (M1=¼·(m1+m2+m3)+⅛·(k+l+o)+1/16·p). The pixel M1 is written to the memory 1c. By repeating the above-described operation, pixels M1, M2, and so forth in the third hierarchical data are stored in the memory 1c.

Figure 12:
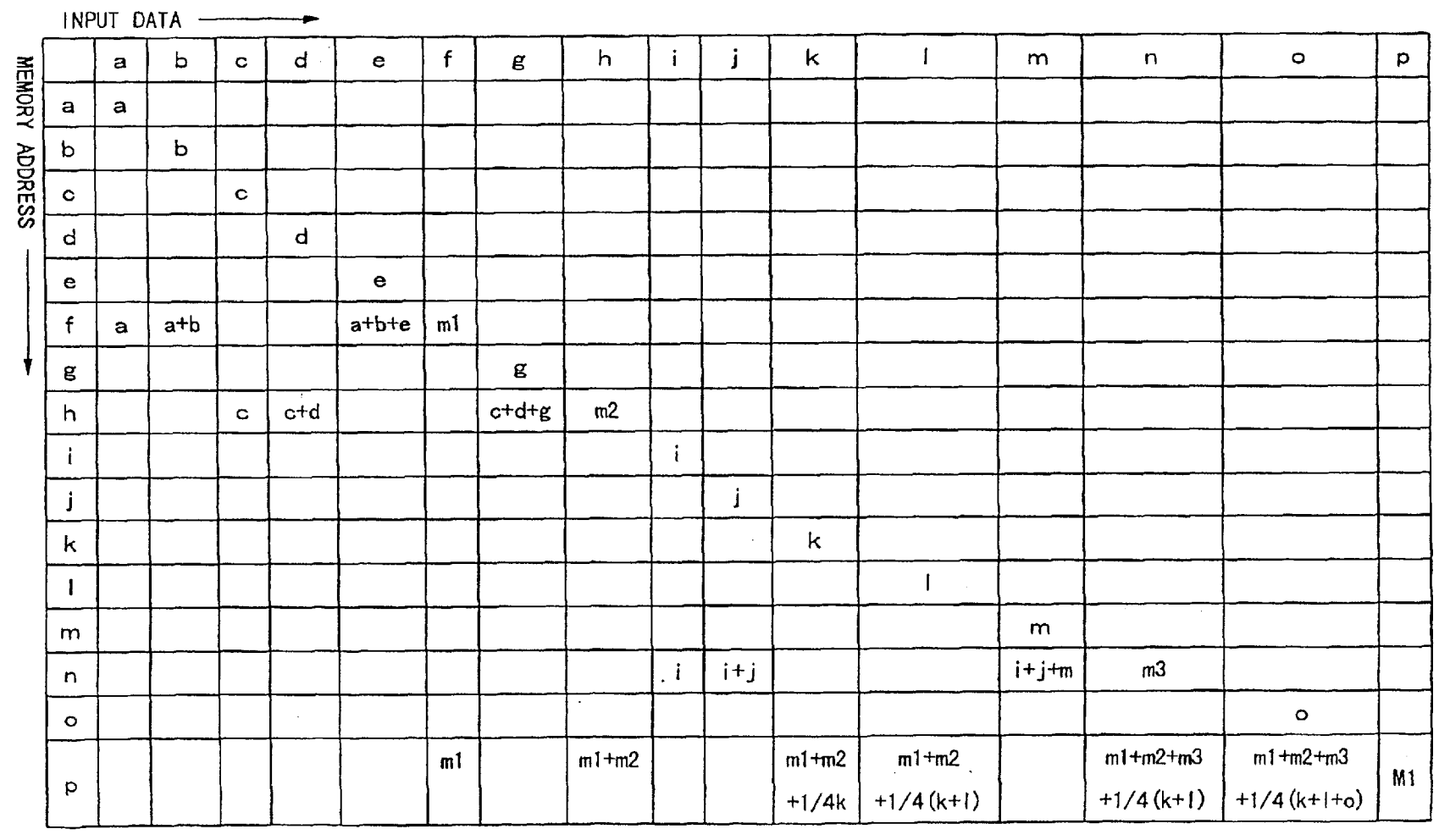

FIG. 12 is a timing chart according to the fourth embodiment of the present invention. The horizontal axis of the timing chart in FIG. 12 shows the time sequence of input picture data generated from the register 2a. The vertical axis of the timing chart shows addresses of the memories 1a, 1b, and 1c. Positions at which the horizontal axis and vertical axis intersect represent contents stored in the memories 1a, 1b, and 1c. Addresses f, h, and n are addresses of the memory 1b. An address p is an address of the memory 1c. The timing chart shown in FIG. 12 corresponds to the description shown in FIGS. 11A to 11D. The values of data shown in FIG. 12 are four times the values of data described in FIGS. 11A to 11D. In the fourth embodiment shown in FIG. 10, by changing the divide-by-4 circuit into a multiply-by-4 circuit and changing the adding device into a subtracting device, an arithmetic operation circuit on the reading side can be accomplished.

According to the present invention, in addition to an average value, difference data thereof may be transmitted. In other words, in addition to an average value m1 of pixels a, b, c, and d, difference data ($\Delta a=a-m1$, $\Delta b=b-m1$, and $\Delta c=c-m1$) is transmitted. Moreover, as data in the second hierarchial level, in addition to an average value M1 of m1, m2, m3, and m4, difference data ($\Delta m1=m1-M1$, $\Delta m2=m2-M1$, and $\Delta m3=m3-M1$) is transmitted. On the receiving side, using the relation of $\Delta a+\Delta b+\Delta c+\Delta d=a+b+c+d-4m1=0$, with $\Delta d=-(\Delta a+\Delta b+\Delta c)$, $\Delta d$ can be obtained. Thus, data in a plurality of hierarchical levels can be transmitted. In addition, since a picture has a local correlation, generally values of difference data are small. When data is requantized with a smaller number of bits, it can be more compressed.

According to the present invention, since the length of average value data tends to increase, a larger number of bits than the number of bits of input pixels may be assigned. In addition, after data in each hierarchical layer is compressed and variable-length encoded, the resultant data may be transmitted. Moreover, average value data may be formed of weighted average value data rather than simple average value data.

According to the present invention, only a semiconductor memory and a signal processing circuit on the reading side may be structured as IC circuits. In this case, picture data in a plurality of hierarchical levels is written to the semiconductor memory beforehand. The semiconductor memory functions as a ROM.

In the third or fourth embodiment of the present invention, the pixel delaying circuit and the line delaying circuit can be omitted. Thus, the cost and space of the IC circuits can be reduced.

As described above, according to the present invention, when hierarchically structured data is stored, it is not necessary to increase the capacity of the memory. In addition, according to the present invention, since the signal processing circuit for the hierarchical encoding process or the hierarchical decoding process is structured on the same substrate as the semiconductor memory, the scale of the hardware can be reduced. Moreover, according to the third and fourth embodiments of the present invention, data is read from the memory. The adding process is performed for the data. The added results are written to the memory. Thus, average values are obtained. Thus, since a pixel delaying circuit and a line delaying circuit that process a plurality of types of data at the same time are not required, the hardware can be simplified.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A memory apparatus for use with a digital picture signal, the apparatus comprising:

first signal processing means for receiving an input digital picture signal and for performing a hierarchical encoding process thereon so as to form hierarchical encoded picture data;

memory means for storing the hierarchical encoded picture data from said first signal processing means; and second processing means for receiving the hierarchical encoded picture data from said memory means which is the same as the hierarchical encoded picture data formed by the first signal processing means and for decoding the received hierarchical encoded picture data in accordance with a hierarchical decoding process to restore said input digital picture signal;

wherein said first signal processing means, said memory means and said second processing means being disposed on a common semiconductor substrate, wherein said first signal processing means forms data in a second hierarchical level with an average value of every N pixels of data in a first hierarchical level, the input digital picture data being the data in the first hierarchical level, and wherein said first signal processing means comprises:

average value calculating means for forming the data in the second hierarchical level with the average value of every N pixels of the data in the first hierarchical level; and means for outputting (N−1) pixels of the data in the first hierarchical level and one pixel of the data in the second hierarchical level to said memory means.

2. The memory apparatus as set forth in claim 1, wherein said first signal processing means further comprises controlling means for controlling said memory means and said average value calculating means in such a manner that said controlling means reads data from said memory means, processes the data, and writes the resultant data into the same address of the data read from said memory means so as to form the average value.

3. The memory apparatus as set forth in claim 1, wherein said first signal processing means further comprises encoding means for compressing the data in the first hierarchical level and the data in the second hierarchical level.

4. The memory apparatus as set forth in claim 2, wherein said controlling means processes data read from said memory means with the input digital picture signal.

5. The memory apparatus as set forth in claim 1, further comprising controlling means and wherein said controlling means controls said memory means and said average value calculating means in such a manner that said controlling means reads data from said memory means, processes data, and writes the resultant data into the same address of the data read from said memory means predetermined times so as to form the average value.

6. The memory apparatus as set forth in claim 1, wherein the memory means is separated for each hierarchy.

7. The memory apparatus as set forth in claim 1, wherein the memory means includes a random access memory (RAM).

8. A memory apparatus for use with a digital picture signal, the apparatus comprising:
   first signal processing means for receiving an input digital picture signal and for performing a hierarchical encoding process thereon so as to form hierarchical encoded picture data;
   memory means for storing the hierarchical encoded picture data from said first signal processing means; and
   second processing means for receiving the hierarchical encoded picture data from said memory means which is the same as the hierarchical encoded picture data formed by the first signal processing means and for decoding the received hierarchical encoded picture data in accordance with a hierarchical decoding process to restore said input digital picture signal;
   wherein said first signal processing means, said memory means and said second processing means being disposed on a common semiconductor substrate,
   wherein said first signal processing means forms data in a second hierarchical level with an average value of every N pixels of data in a first hierarchical level, the input digital picture data being the data in the first hierarchical level, and
   wherein said first signal processing means comprises:
   average value calculating means for forming the data in the second hierarchical level with the average value of every N pixels of the data in the first hierarchical level;
   difference data generating means for generating (N−1) difference values between the average value of the data in the second hierarchical level and the data in the first hierarchical level; and
   means for outputting the (N−1) difference values in the first hierarchical level received from said difference data generating means and the data in the second hierarchical level received from said average value calculating means to said memory means.

9. The memory apparatus as set forth in claim 8, wherein the memory means is separated for each hierarchy.

10. A memory apparatus comprising:
    memory means having picture data in a plurality of hierarchical levels with different resolutions recorded therein; and
    first signal processing means to restore an input digital picture signal adapted for performing a hierarchical decoding process for generating data in a first hierarchical level and data in a second hierarchical level with data that is read from said memory means, the data in the second hierarchical level being different from the data in the first hierarchical level in at least resolutions,
    wherein a second processing means for performing a hierarchical encoding process on a respective input digital picture signal, said memory means operable to have data corresponding to the encoded input digital picture signal stored therein, and said first signal processing means operable to receive the same data corresponding to the encoded picture data formed by the second signal processing means from said memory means and to restore said respective input digital picture signal are disposed on a common semiconductor substrate, and
    wherein said second signal processing means includes average value calculating means for forming the data in the second hierarchical level with an average value of every N pixels of the data in the first hierarchical level and means for outputting (N−1) pixels of the data in the first hierarchical level and one pixel of the data in the second hierarchical level to said memory means.

11. The memory apparatus as set forth in claim 10, wherein said
    first signal processing means comprises:
    arithmetic operation means; and
    controlling means for controlling said arithmetic operation means and said memory means in such a manner that said controlling means reads data from said memory means, performs an arithmetic operation for the data, and writes the resultant data to said memory means so as to form the data in the first hierarchical level.

12. The memory apparatus as set forth in claim 10, wherein said memory means is adapted for storing one pixel of data in the second hierarchical level obtained by the average value of every N pixels of data in the first hierarchical level and (N−1) pixels of the data in the first hierarchical level as a data block and wherein said first signal processing means has data reproducing means for restoring data in the first hierarchical level that has not been written to said memory with the data in the first hierarchical level and the data in the second hierarchical level that are read from said memory means.

13. The memory apparatus as set forth in claim 1, wherein the memory means includes a random access memory (RAM).

14. The memory apparatus as set forth in claim 10, wherein the memory means is separated for each hierarchy.

15. The memory apparatus as set forth in claim 10, wherein the memory means includes a random access memory (RAM).

16. A method for writing data comprising the step of:
    performing a hierarchical encoding process by use of a first processing means for generating at least data in a first hierarchical level and data in a second hierarchical level with input picture data, the data in the first hierarchical level being different from the data in the second hierarchical level in resolutions, the hierarchical encoding step comprising the steps of:

forming the data in the second hierarchical level with the average value of every N pixels of the data in the first hierarchical level; and outputting (N−1) pixels of the data in the first hierarchical level and one pixel of the data in the second hierarchical level to a memory means for storage therein, wherein said first processing means, said memory means and a second processing means for receiving the hierarchical encoded data from said memory means and for decoding the received hierarchical encoded picture data in accordance with a hierarchical decoding process to restore the input picture data are disposed on a common semiconductor substrate.

17. A method for writing data comprising the step of:

performing a hierarchical encoding process by use of a first processing means for generating at least data in a first hierarchical level and data in a second hierarchical level with input picture data, the data in the first hierarchical level being different from the data in the second hierarchical level in resolutions, the hierarchical encoding step comprising the steps of:

forming the data in the second hierarchical level with the average value of every N pixels of the data in the first hierarchical level;

generating (N−1) difference values between the average value of the data in the second hierarchical level and the data in the first hierarchical level; and outputting the (N−1) difference values of the data in the first hierarchical level and the data in the second hierarchical level to a memory means for storage therein, wherein first said processing means, said memory means and a second processing means for receiving the hierarchical encoded data from said memory means and for decoding the received hierarchical encoded picture data in accordance with a hierarchical decoding process to restore the input picture data are disposed on a common semiconductor substrate.

18. A reading method for causing signal processing means to read data of which a digital picture signal has been processed from memory means, the signal processing means and the memory means being disposed on a common semiconductor substrate, the reading method comprising the step of:

performing a hierarchical decoding process, corresponding to a hierarchical encoding process, for generating at least data in a first hierarchical level and data in a second hierarchical level with the input picture data, the data in the first hierarchical level being different from the data in the second hierarchical level in resolutions, the hierarchical decoding process step comprising the steps of:

restoring data in the first hierarchical level that has not been written to the memory means with the data in the first hierarchical level and the data in the second hierarchical level being read from the memory means; and selectively outputting the restored data in the first hierarchical level or the restored data in the second hierarchical level, wherein said signal processing means is adapted to perform a hierarchical encoding process on a respective digital picture signal and a hierarchical decoding process to restore said respective digital picture signal, and wherein said signal processing means includes average value calculating means for forming the data in the second hierarchical level with an average value of every N pixels of the data in the first hierarchical level, and means for outputting (N−1) pixels of the data in the first hierarchical level and one pixel of the data in the second hierarchical level to said memory means.

19. A signal processing apparatus comprising:

signal processing means supplied with an input signal and a signal read from a memory for processing a predetermined calculation between said input signal and said signal read from said memory and outputting a result of said predetermined calculation; and control means for controlling said signal processing means and said memory so that the signal is read out from said memory and the signal read out from said memory is processed at said signal processing means with said input signal and the result of said predetermined calculation is written in said memory, wherein said signal processing means is adapted to perform a hierarchical encoding process on a respective input signal and a hierarchical decoding process to restore said respective input signal and wherein said signal processing means, said control means and said memory are provided on a common semiconductor substrate and wherein said signal processing means includes average value calculating means for forming the data in the second hierarchical level with an average value of every N pixels of the data in the first hierarchical level, and means for outputting (N−1) pixels of the data in the first hierarchical level and one pixel of the data in the second hierarchical level to said memory.

20. The signal processing apparatus according to claim 19, wherein said control means controls said memory so that the result of said signal processing means is written in a different address of said memory from that of the corresponding signal read out from said memory.

21. The signal processing apparatus according to claim 19, wherein said memory is provided within said signal processing apparatus.

22. The signal processing apparatus according to claim 21, wherein said control means controls said memory so that the signal of the first hierarchy is read from the memory and said signal processing means processes said predetermined calculation between said input signal and said signal of the first hierarchy to generate a signal of the second hierarchy.

23. The memory apparatus as set forth in claim 19, wherein the memory is separated for each hierarchy.

24. The memory apparatus as set forth in claim 19, wherein the memory is a random access memory (RAM).

25. A memory apparatus for use with a digital picture signal, the apparatus comprising:

first signal processing means for receiving an input digital picture signal and for performing a hierarchical encoding process thereon so as to form hierarchical encoded picture data;

memory means for storing the hierarchical encoded picture data from said first signal processing means; and second processing means for receiving the hierarchical encoded picture data from said memory means which is the same as the hierarchical encoded picture data formed by the first signal processing means and for decoding the received hierarchical encoded picture data in accordance with a hierarchical decoding process to restore said input digital picture signal;

wherein said first signal processing means, said memory means and said second processing means being disposed on a common semiconductor substrate.

* * * * *